United States Patent
Kobata (10) Patent No.: US 9,915,293 B2
(45) Date of Patent: Mar. 13, 2018

(54) SLIDING CONSTANT-VELOCITY JOINT (71) Applicant: JTEKT Corporation, Osaka-shi (JP)

(72) Inventor: Keishi Kobata, Anjo (JP)

(73) Assignee: JTEKT CORPORATION, Osaka-shi (JP)

( * ) Notice: Subject to any disclaimer, the term of this patent is extended or adjusted under 35 U.S.C. 154(b) by 117 days.

(21) Appl. No.: 14/987,014

(22) Filed: Jan. 4, 2016

(65) Prior Publication Data

US 2016/0201731 A1    Jul. 14, 2016

(30) Foreign Application Priority Data

Jan. 13, 2015 (JP) ................................ 2015-004063

(51) Int. Cl.
*F16D 3/205*    (2006.01)
*F16D 3/202*    (2006.01)

(52) U.S. Cl.
CPC .... *F16D 3/2055* (2013.01); *F16D 2003/2026* (2013.01)

(58) Field of Classification Search
CPC ................ F16D 3/2055; F16D 2003/2026
USPC ......................................................... 464/111
See application file for complete search history.

(56) References Cited

U.S. PATENT DOCUMENTS 5,571,047 A * 11/1996 Stall .................... F16D 3/205
                                                           464/111
RE39,715 E * 7/2007 Perrow ................ F16D 3/2055
                                                           464/111

FOREIGN PATENT DOCUMENTS

JP    2012-197803    10/2012

* cited by examiner

*Primary Examiner* — Gregory J Binda
(74) *Attorney, Agent, or Firm* — Oblon, McClelland, Maier & Neustadt, L.L.P.

(57) ABSTRACT

A constant-velocity joint 1 includes an outer ring with three raceway grooves formed therein, a tripod member having three tripod shaft portions, and roller units each having a cylindrical inner roller externally fitted over the corresponding tripod shaft portion and an outer roller. The outer roller has an annular surface facing a ceiling surface of a raceway groove. The ceiling surface includes first and second contact portions and that come into contact with an outer edge of the annular surface when the roller unit is tilted. When an outside diameter of the annular surface is represented as a roller end surface diameter A, a width of the outer roller in an axial direction is represented as a roller width B, and an interval between the first and second contact portions is represented as a contact portion interval H, a relational expression $(A+B)/H \geq 2.5$ is satisfied.

4 Claims, 6 Drawing Sheets

B: ROLLER WIDTH

FIG. 6B

SLIDING CONSTANT-VELOCITY JOINT

INCORPORATION BY REFERENCE

The disclosure of Japanese Patent Application No. 2015-004063 filed on Jan. 13, 2015 including the specification, drawings and abstract, is incorporated herein by reference in its entirety.

BACKGROUND OF THE INVENTION

1. Field of the Invention

The present invention relates to a sliding constant-velocity joint used for a driving-force transmission path in a vehicle and the like.

2. Description of Related Art

A conventional sliding constant-velocity joint is described, for example, in Japanese Patent Application Publication No. 2012-197803 (JP 2012-197803 A). The sliding constant-velocity joint includes an outer ring shaped like a bottomed tube and having three raceway grooves, a tripod member with three tripod shaft portions extending in a radial direction, and double-roller-type roller units respectively supported by the tripod shaft portions so as to be pivotal. Each of the double-roller-type roller units has an outer roller that can roll through the corresponding raceway groove in the outer ring, an inner roller pivotally supported on an outer peripheral surface of the corresponding tripod shaft portion, and a plurality of rolling members (needle rollers) interposed between the outer roller and the roller so as to be able to roll. The tripod shaft portion is arranged so as to be able to swing with respect to the roller unit.

In the sliding constant-velocity joint described in JP 2012-197803 A, when a shaft fitted in the tripod member is tilted and rotated with respect to the outer ring, the roller unit is tilted in the raceway groove (pitching) to cause the outer roller and a ceiling surface of the raceway groove (a bottom surface of the raceway groove on the outer peripheral side in the outer ring) slide on each other. Thus, sliding friction occurs between these sliding portions. Furthermore, the outer roller rolls with an axial direction of the rolling elements tilted with respect to a direction in which the raceway groove extends. Consequently, sliding friction also occurs on an outer peripheral surface of the outer roller. Such sliding friction caused by the tilt of the roller unit is a factor in occurrence of a compelling force (inducing thrust force).

SUMMARY OF THE INVENTION

An object of the present invention is to provide a sliding constant-velocity joint that suppresses sliding friction between an outer ring and an outer roller to reduce compelling force.

A sliding constant-velocity joint in an aspect of the present invention includes:

- an outer ring having a tubular portion with three raceway grooves formed in an inner peripheral surface of the tubular portion and extending in a direction of a central axis of the tubular portion;
- a tripod member having an annular boss portion coupled to a shaft and having three tripod shaft portions provided so as to extend outward from an outer peripheral surface of the boss portion in a radial direction of the boss portion, each of three tripod shaft portions provided so as to be inserted into corresponding one of the raceway grooves; and
- three roller units each having a cylindrical inner roller externally fitted over corresponding one of the tripod shaft portions so as to be able to swing, an outer roller that is rotatable coaxially with and relative to the inner roller and that has an outer peripheral surface shaped like a protruding curved surface, and a plurality of rolling elements interposed between the inner roller and the outer roller; wherein
- an inner surface of each of the raceway grooves includes a pair of raceway surfaces which has a section shaped like a recessed circular arc and on which the outer roller rolls and also includes a ceiling surface formed between the pair of raceway surfaces,
- the outer roller has a flat annular surface formed inside the outer peripheral surface shaped like a protruding curved surface and facing the ceiling surface,
- the ceiling surface includes a first contract portion and a second contact portion that come into contact with an outer edge of the annular surface of the outer roller when the roller unit is tilted in the raceway groove, and
- when an outside diameter of the annular surface of the outer roller is represented as a roller end surface diameter A, a width of the outer roller in an axial direction is represented as a roller width B, and an interval between the first and second contact portions is represented as a contact portion interval H, a relational expression $(A+B)/H \geq 2.5$ is satisfied.

The aspect of the present invention suppresses the sliding friction between the outer ring and the outer roller to enable a reduction in the compelling force.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A sliding constant-velocity joint according to an embodiment of the present invention will be described below with reference to FIGS. 1 to 5. The embodiment described below is illustrated as a preferred specific example for implementation of the present invention, and the technical scope of the present invention is not limited to this specific example.

Figure 1:
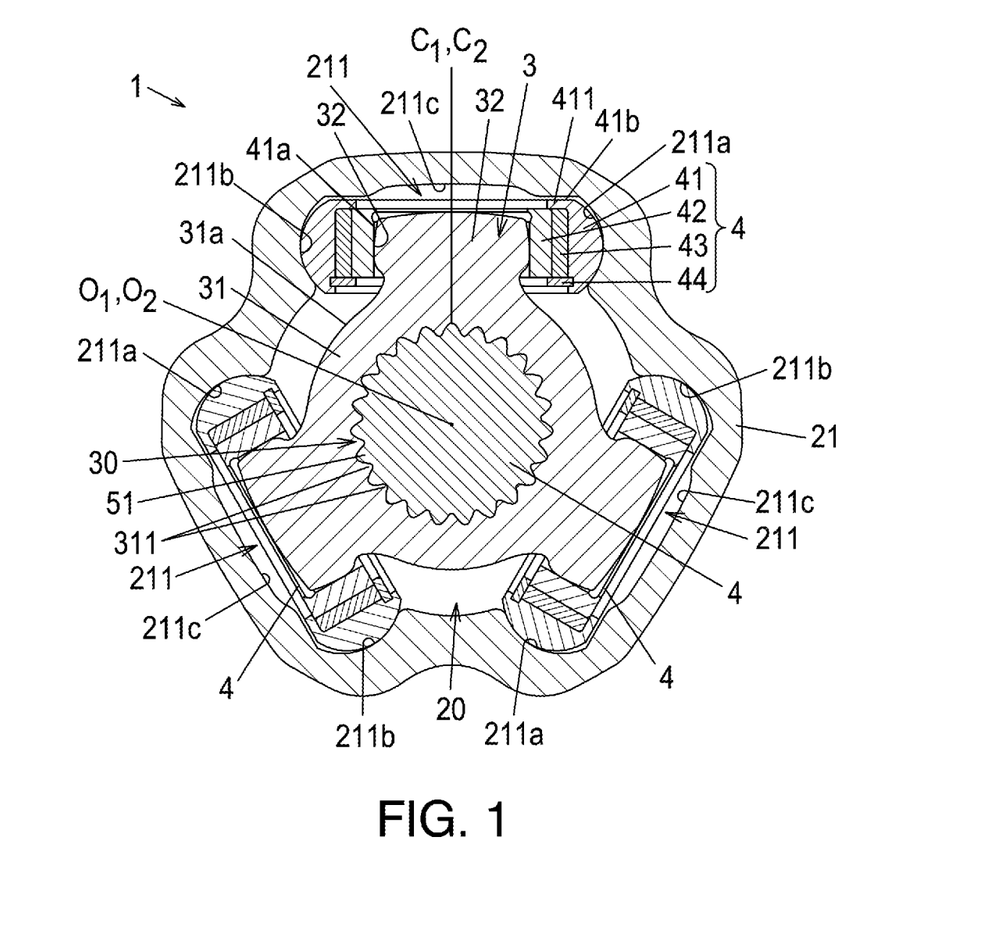
FIG. 1 is a sectional view depicting a sectional shape of a sliding constant-velocity joint according to the present embodiment at a joint angle of 0° as seen in a direction of an axis of rotation.
Figure 2:
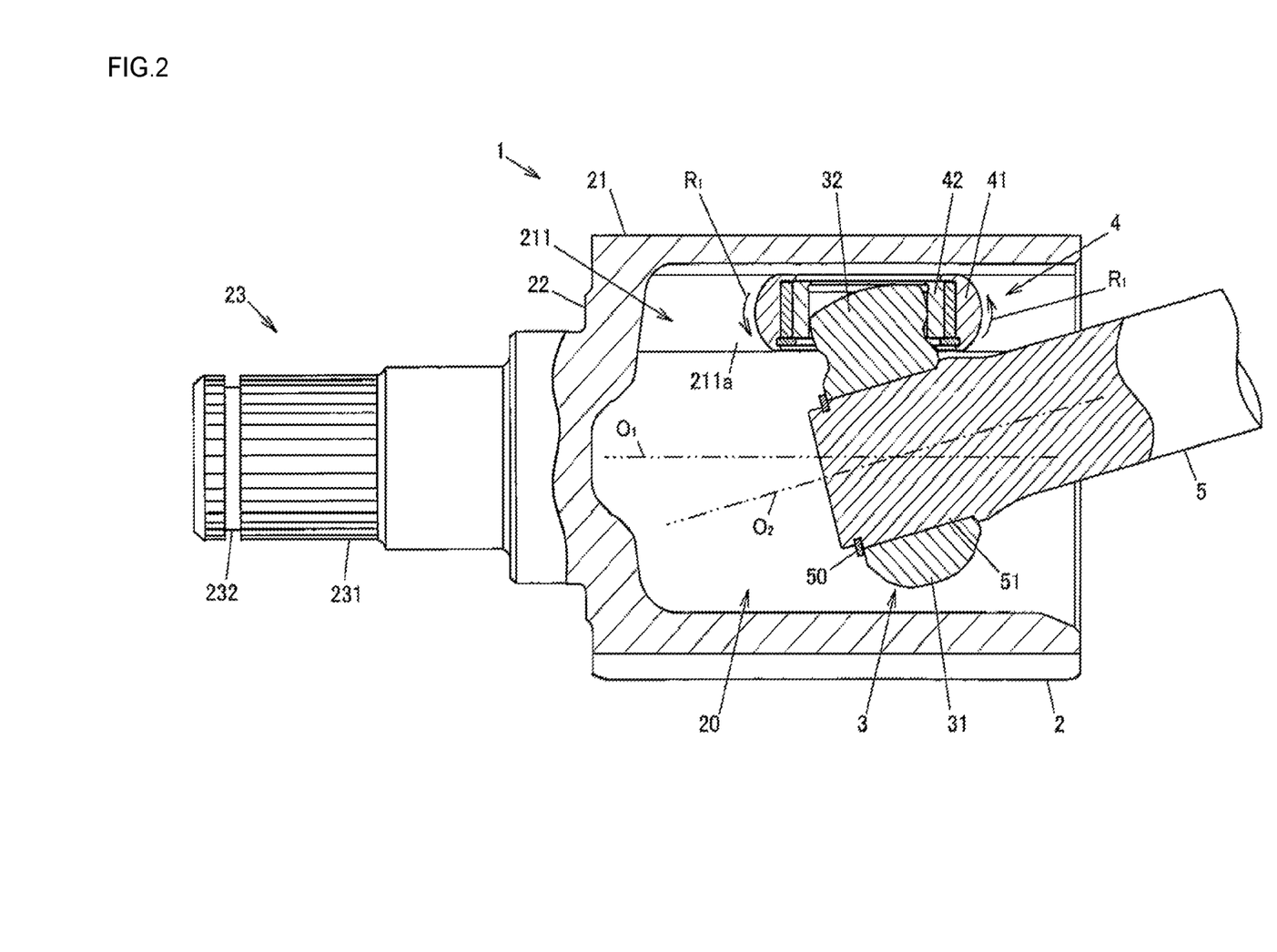
FIG. 2 is a partial sectional view depicting a section of a part of the sliding constant-velocity joint, the section taken along the axis of rotation.

FIG. 1 is a sectional view depicting a sectional shape of the sliding constant-velocity joint at a joint angle of 0° at which an axis of rotation $O_1$ of an outer ring coincides with an axis of rotation $O_2$ of a tripod member, as seen in the direction of the axis of rotation $O_1$ and the axis of rotation $O_2$. FIG. 2 is a partial sectional view depicting a section of a part of the sliding constant-velocity joint, the section extending along the axis of rotation $O_1$ and the axis of rotation $O_2$. The sliding constant-velocity joint is hereinafter simply referred to as a constant-velocity joint.

The constant-velocity joint 1 is arranged between a shaft (an intermediate shaft of a drive shaft) 5 and a side gear that is an output member of a differential apparatus in a vehicle and that is not depicted in the drawings. The constant-velocity joint 1 transmits a torque (driving force) that rotates wheels to the shaft 5. The constant-velocity joint 1 is also referred to as a tripod constant-velocity joint and has an outer ring 2, a tripod member 3, and three roller units 4 (FIG. 2 depicts only one roller unit 4). The outer ring 2 is coupled to the side gear of the differential apparatus so as to rotate together with the side gear. The tripod member 3 is coupled to the shaft 5 so as to rotate together with the shaft 5. The roller units 4 are fitted over three tripod shaft portions 32 of the tripod member 3 (FIG. 2 depicts only one tripod shaft portion 32). Configurations of these members will be described below in brief.

The outer ring 2 has a tubular portion 21 with three raceway grooves 211 formed in an inner peripheral surface of the tubular portion 21 and extending in the direction of a central axis of the tubular portion 21, a bottom portion 22 that closes one end of the tubular portion 21, and a shaft-like stem portion 23 that protrudes from a central portion of the bottom portion 22 in a direction opposite to the tubular portion 21. The tubular portion 21 and the bottom portion 22 form a bottomed tube. A housing space 20 is formed inside the tubular portion 21 so as to house the tripod member 3 and the three roller units 4. The central axis of the tubular portion 21 coincides with the axis of rotation $O_1$ of the outer ring 2.

As depicted in FIG. 1, the three raceway grooves 211 are formed at regular intervals along a circumferential direction of the tubular portion 21. Each of the three roller units 4 is housed in a corresponding one of the three raceway grooves 211. An inner surface of each raceway groove 211 includes a pair of raceway surfaces 211a and 211b which has a section shaped like a recessed circular arc and on which an outer roller 41 of the roller unit 4 rolls and a ceiling surface 211c formed between the raceway surfaces 211a and 211b. The raceway surfaces 211a and 211b lie parallel to each other across the roller unit 4 so as to face each other.

Of the raceway surfaces 211a and 211b, a raceway surface on which the outer roller 41 of the roller unit 4 rolls when the vehicle is accelerated while traveling forward is referred to as the first raceway surface 211a. The other raceway surface facing the first raceway surface 211a is referred to as the second raceway surface 211b. The first raceway surface 211a and the second raceway surface 211b lie parallel to each other across the roller unit 4 so as to face each other.

A spline fitting portion 231 that is spline-fitted into the differential apparatus and the side gear is formed on the stem portion 23. An annular groove 232 for holding a ring-like retaining unit (not depicted in the drawings) such as a snap ring is formed at an end of the stem portion 23 that is closer to a tip portion of the stem portion 23 than the spline fitting portion 231 (an end on the opposite side of the stem portion 23 from a base end that is closer to the bottom portion 22). This retaining unit prevents the stem portion 23 from slipping out from the side gear.

The tripod member 3 has an annular boss portion 31 coupled to the shaft 5 and three tripod shaft portions 32 provided so as to extend outward from an outer peripheral surface 31a of the boss portion 31 in a radial direction of the boss portion 31 and respectively inserted into the raceway grooves 211 in the outer ring 2. A through-hole 30 is formed in a central portion of the boss portion 31 such that the shaft 5 is inserted through the through-hole 30. A plurality of spline protrusions 311 is formed on an inner peripheral surface of the through-hole 30.

A spline fitting portion 51 is formed at an end of the shaft 5. The spline protrusions 311 mesh with the spline fitting portion 51 to couple the shaft 5 and the tripod member 3 together so that the shaft 5 and the tripod member 3 are non-rotatable relative to each other. The tripod member 3 is retained by a snap ring 50 (see FIG. 2) fitted over the shaft 5.

The three tripod shaft portions 32 are provided at regular intervals along a circumferential direction of the boss portion 31. A tip portion of each tripod shaft portion 32 is formed like a partly spherical surface. The roller unit 4 is fitted over each of the three tripod shaft portions 32 so as to be able to swing and so as to be slidable in an axial direction of the tripod shaft portion 32.

The three roller units 4 are similarly configured. Each of the roller units 4 has a cylindrical inner roller 42 externally fitted over the tripod shaft portion 32 so as to be able to swing, the outer roller 41 that is rotatable coaxially with and relative to the inner roller 42 and that has an outer peripheral surface 41a shaped like a protruding curved surface, and a plurality of rolling elements 43 interposed between the outer roller 41 and the inner roller 42. The outer roller 41 rotates around a central axis $C_1$ thereof with respect to the inner roller 42 in conjunction with rolling of the rolling elements 43. Needle rollers are adopted as the rolling elements 43.

The outer peripheral surface 41a of the outer roller 41 is curved so as to protrude at a curvature corresponding to the first raceway surfaces 211a and the second raceway surface 211b of the outer ring 2. At the time of torque transmission, the outer peripheral surface 41a of the outer roller 41 comes into angular contact, at two points, with the first raceway surface 211a or the second raceway surface 211b. The outer roller 41 has a flat annular surface 41b that is located inside the outer peripheral surface 41a and that faces the ceiling surface 211c of the raceway groove 211 in the outer ring 2. The annular surface 41b is an end surface of the outer roller 41 in the axial direction.

An inner peripheral surface 42a of the inner roller 42 faces a partly spherical outer peripheral surface 32a of the tripod shaft portion 32. The inner peripheral surface 42a of the inner roller 42 slides on the partly spherical outer peripheral surface 32a of the tripod shaft portion 32 to enable the roller unit 4 to swing with respect to the tripod shaft portion 32 and to slide in the axial direction along a central axis $C_2$ of the tripod shaft portion 32. FIG. 1 illustrates that the central axis $C_1$ of the outer roller 41 coincides with the central axis $C_2$ of the tripod shaft portion 32.

A flange portion 411 protruding inward is formed at one end of the outer roller 41 in the axial direction. An inside diameter of the flange portion 411 is formed to be smaller than an outside diameter of the inner roller 42 to regulate movement, in the axial direction, of the inner roller 42 and the rolling elements 43 to the outside (to the exterior of the outer ring 2). On the other hand, a snap ring 44 is fitted over the other end of the outer roller 41 in the axial direction to regulate movement of the inner roller 42 and the rolling elements 43 to the inside (to the interior of the outer ring 2). This configuration enables the outer roller 41 and the inner roller 42 to rotate coaxially with and relative to each other.

Now, general operations of the constant-velocity joint 1 will be described. As depicted in FIG. 2, when the tripod member 3 rotates along with the shaft 5 such that the axis of rotation $O_2$ of the tripod member 3 is tilted with respect to the axis of rotation $O_1$ of the outer ring 2, the position of the tripod shaft portion 32 changes periodically in a direction in which the raceway groove 211 extends. Accordingly, the outer roller 41 rolls on the first raceway surface 211a or the second raceway surface 211b to rotate with respect to the inner roller 42. Furthermore, since the tripod shaft portion 32 is tilted with respect to the outer ring 2, a frictional force is exerted between the outer peripheral surface 32a of the tripod shaft portion 32 and the inner peripheral surface 42a of the inner roller 42 to tilt the roller unit 4 depicted in FIG. 2 counterclockwise in FIG. 2 with respect to the outer ring 2. In FIG. 2, the direction of the tilt is indicated by arrows $R_1$.

The tilt of the roller unit 4 with respect to the outer ring 2 is hereinafter referred to as pitching. The tilt angle of the roller unit 4 with respect to the outer ring 2 is hereinafter referred to as a pitching angle. The pitching of the roller unit 4 is regulated by abutting contact of the annular surface 41b of the outer roller 41 with the ceiling surface 211c of the raceway groove 211. Now, a configuration that regulates the pitching of the roller unit 4 etc. will be described in detail.

Figure 3A:
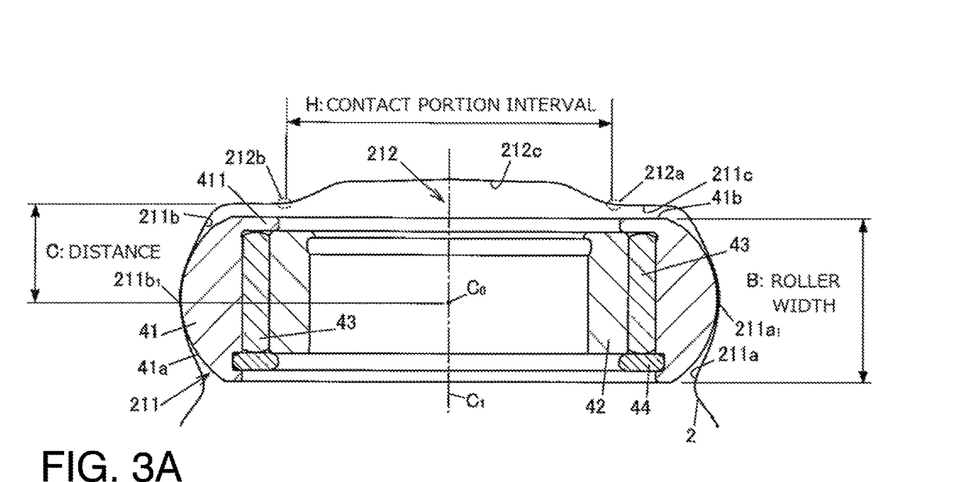
FIG. 3A is a diagram illustrating a relationship between a roller unit and an outer ring.
Figure 3B:
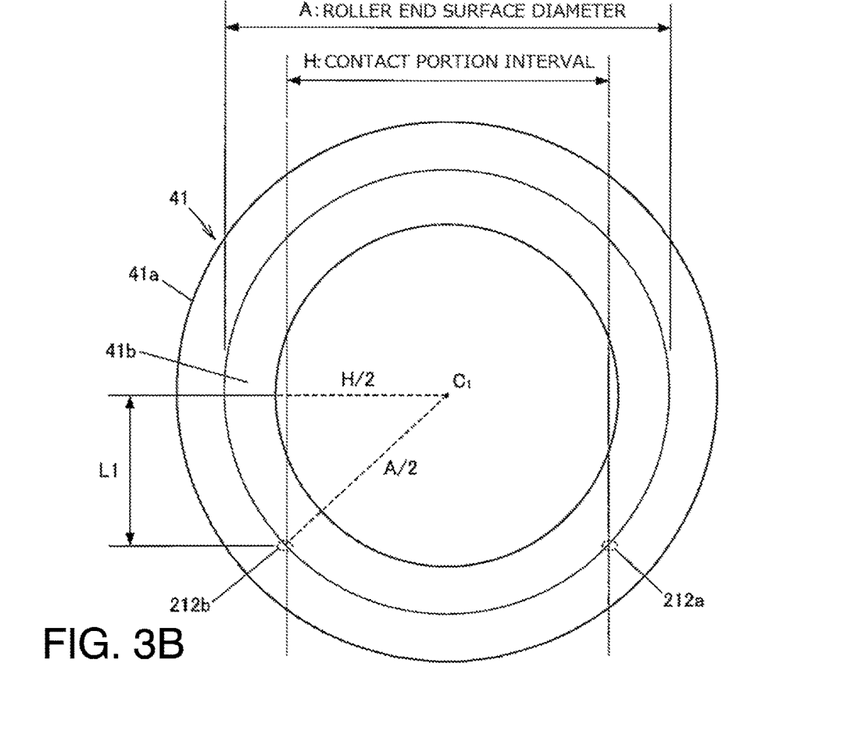
FIG. 3B is a diagram illustrating the relationship between the raceway groove and the outer roller.

FIGS. 3A-3B illustrate a relationship between the roller unit 4 and the outer ring 2 obtained when the roller unit 4 is arranged at an intermediate position between the first raceway surface 211a and the second raceway surface 211b at a pitching angle of 0°. FIG. 3A depicts a section that is orthogonal to the axis of rotation $O_1$ of the outer ring 2 and illustrates the roller unit 4 positioned in an upper portion of the outer ring 2 and the raceway groove 211 with the roller unit 4 housed therein. FIG. 3B schematically illustrates the relationship between the raceway groove 211 and the outer roller 41 obtained when the outer roller 41 is externally viewed through the outer ring 2. In FIG. 3B, an up-down direction corresponds to the direction in which the raceway groove 211 extends.

In FIG. 3A, pitching of the roller unit 4 results in pitching of the outer roller 41, and the annular surface 41b of the outer roller 41 come into contact, at two points, with the ceiling surface 211c of the raceway groove 211 at an outer edge of the annular surface 41b. That is, the ceiling surface 211c includes a first contact portion 212a and a second contact portion 212b that come into contact with the outer edge of the annular surface 41b of the outer roller 41 when the roller unit 4 is tilted in the raceway groove 211. The annular surface 41b of the outer roller 41 comes into contact with the ceiling surface 211c at the two points (the first and second contact portions 212a and 212b) to distribute a load imposed on the outer ring 2 via the outer roller 41 as a result of the pitching of the roller unit 4. Thus, local friction on the ceiling surface 211c is suppressed.

As depicted in FIG. 3A, in the ceiling surface 211c of the raceway groove 211, a recessed groove 212 is formed which is recessed outward in the tubular portion 21 and extends in the direction of the central axis of the tubular portion 21. The first and second contact portions 212a and 212b are formed at both ends of the recessed groove 212 in the circumferential direction of the tubular portion 21. The first contact portion 212a is formed at an end of the recessed groove 212 that is closer to the first raceway surface 211a. The second contact portion 212b is formed at an end of the recessed groove 212 that is closer to the second raceway surface 211b. The depth of the recessed groove 212 in a radial direction of the tubular portion 21 is set to such a dimension that prevents the outer roller 41 from coming into contact with the bottom surface 212c of the recessed groove 212.

In the description below, in the section depicted in FIG. 3A, the interval between the first contact portion 212a and the second contact portion 212b is represented as a contact portion interval H, the outside diameter of the annular surface 41b of the outer roller 41 is represented as a roller end surface diameter A, and the width of the outer roller 41 along the central axis C1 is represented as a roller width B. The contact portion interval H corresponds to the groove width of the recessed groove 212.

A distance C in the description below represents a distance, in the radial direction of the tubular portion 21, between: a central position of the raceway groove 211 between the first raceway surface 211a and the second raceway surface 211b; and the first and second contact portions 212a and 212b. Specifically, the central position of the raceway groove 211 is a bisection point of a segment connecting the deepest portion $211a_1$ of the first raceway surface 211a and the deepest portion $211b_1$ of the second raceway surface 211b as viewed from the central axis $C_1$ of the outer roller 41 located at a joint angle of 0°. In the example illustrated in FIGS. 3A-3B, the central position of the raceway groove 211 coincides with a central point $C_0$ of the outer roller 41. In other words, the distance C is the distance, in the radial direction of the tubular portion 21, between: the deepest portions $211a_1$ and $211b_1$ of the first and second raceway surfaces 211a and 211b of the raceway groove 211; and the first and second contact portions 212a and 212b.

The central point $C_0$ of the outer roller 41 is a point corresponding to a pitching center of the roller unit 4 on the central axis $C_1$ of the outer roller 41. In the present embodiment, the central point $C_0$ is a bisection point of the roller width B on the central axis $C_1$ of the outer roller 41.

Figure 4:
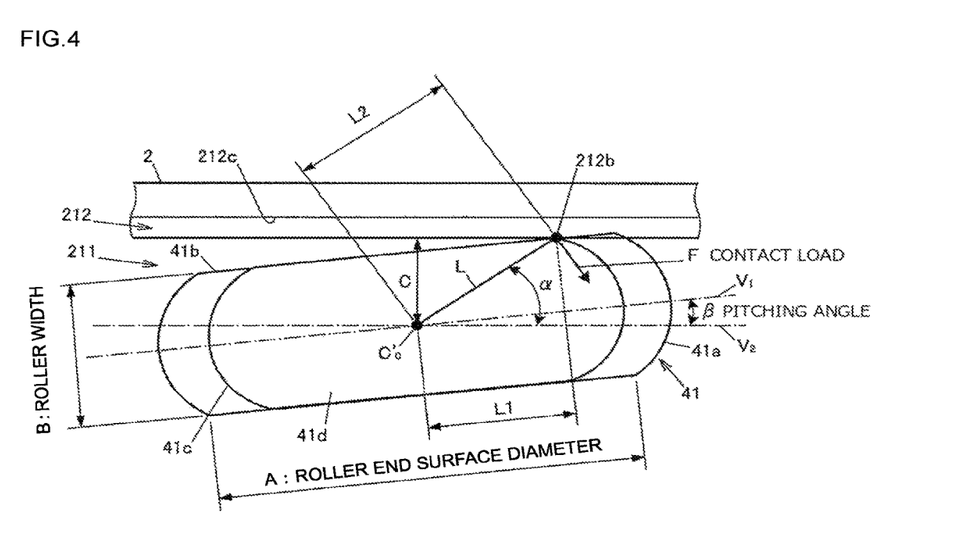
FIG. 4 is a schematic diagram schematically depicting an outer roller of the roller unit having pitched in a raceway groove.

FIG. 4 is a schematic diagram schematically depicting the outer roller 41 of the roller unit 4 having pitched in the raceway groove 211. In FIG. 4, for clarification of description, the pitching angle of the outer roller 41 is exaggerated.

FIG. 4 depicts the outer roller 41 as viewed in a direction orthogonal to the central axis $C_1$ of the outer roller 41. FIG. 4 also depicts, inside a contour line indicating the contour of the outer roller 41, an outer contour line 41c of a section of the outer roller 41 in an imaginary plane that includes the second contact portion 212b having come into contact with the annular surface 41b of the outer roller 41 and that is parallel to the central axis $C_1$ of the outer roller 41 and the axis of rotation $O_1$ of the outer ring 2. A plane inside the outer contour line 41c in the section is hereinafter referred to as an imaginary section 41d.

In FIG. 4, a point $C'_0$ in a central portion of the imaginary section 41d is a point that results from projection of the central point $C_0$ of the outer roller 41 in a direction orthogonal to the imaginary section 41$d$ and that serves as a center of rotation when the outer roller 41 pitches. The point $C'_0$ hereinafter refers to a pitching central point on the imaginary section 41$d$. The pitching angle $\beta$ of the outer roller 41 is represented as an angle defined between a first imaginary line $V_1$ and a second imaginary line $V_2$. The first imaginary line $V_1$ passes through the pitching central point $C'_0$ on the imaginary section 41$d$ and is orthogonal to the axial direction of the outer roller 41, with the outer edge of the annular surface 41$b$ of the outer roller 41 in contact with the first and second contact portions 212$a$ and 212$b$. The second imaginary line $V_2$ passes through the pitching central point $C'_0$ on the imaginary section 41$d$ and is parallel to the axis of rotation $O_1$ of the outer ring 2.

A segment L that connects the pitching central point $C'_0$ to the second contact portion 212$b$ on the imaginary section 41$d$ indicates a moment arm obtained when the outer roller 41 pitches. The length of the segment represents a pitching moment arm length L2. An angle defined between the segment L and the second imaginary line $V_2$ is hereinafter referred to as a moment arm angle $\alpha$.

As depicted in FIG. 4 and FIG. 3B, a distance between the pitching central point $C'_0$ and the second contact portion 212$b$ in the direction in which the first imaginary line $V_1$ extends is represented as a distance L1. Then, as depicted in the lower half of FIG. 3, the distance L1, along with H/2 that is half the contact portion interval H, forms a right triangle with a slope corresponding to A/2 that is half the roller end surface diameter A. Thus, the distance L1 can be expressed by Expression (1).

$$L1 = \frac{\sqrt{A^2 - H^2}}{2} \quad (1)$$

The pitching moment arm length L2 corresponds to the slope of the right triangle including B/2 that is half the roller width B and the distance L1 as depicted in FIG. 4. Thus, the pitching moment arm length L2 can be represented by Expression (2).

$$L2 = \sqrt{\left(\frac{B}{2}\right)^2 + L1^2} = \frac{\sqrt{B^2 + A^2 - H^2}}{2} \quad (2)$$

The moment arm angle $\alpha$ can be represented by Expression (3) using the above-described distance C and pitching moment arm length L2.

$$a = \sin^{-1}\left(\frac{C}{L2}\right) = \sin^{-1}\left(\frac{2C}{\sqrt{B^2 + A^2 - H^2}}\right) \quad (3)$$

On the other hand, the pitching angle $\beta$ of the outer roller 41 can be represented by Expression (4).

$$\beta = \alpha - \sin^{-1}\left\{\frac{(B/2)}{L2}\right\} \quad (4)$$

$$= \sin^{-1}\left(\frac{2C}{\sqrt{B^2 + A^2 - H^2}}\right) - \sin^{-1}\left(\frac{B}{\sqrt{B^2 + A^2 - H^2}}\right)$$

As depicted in FIG. 4, the outer roller 41 is subjected to a contact load F in a direction orthogonal to the segment L when the annular surface 41$b$ of the outer roller 41 comes into contact with the second contact portion 212$b$ of the outer ring 2. The contact load F causes the outer roller 41 to be subjected to a pitching moment with the center of rotation corresponding to the central point $C_0$ of the outer roller 41. The magnitude M of the pitching moment depends on the pitching moment arm length L2 and can be represented by a relational expression M=F×L2.

The magnitude M (=F×L2) of the pitching moment is constant, and thus, the contact load F decreases as the pitching moment arm length L2 increases. As is apparent from Expression (2), the pitching moment arm length L2 increases as the roller end surface diameter A and the roller width B increase or the contact portion interval H decreases. In the present embodiment, focusing on this relationship, the roller end surface diameter A, the roller width B, and the contact portion interval H are set to satisfy the relational expression (A+B)/H≥2.5.

Figure 5A:
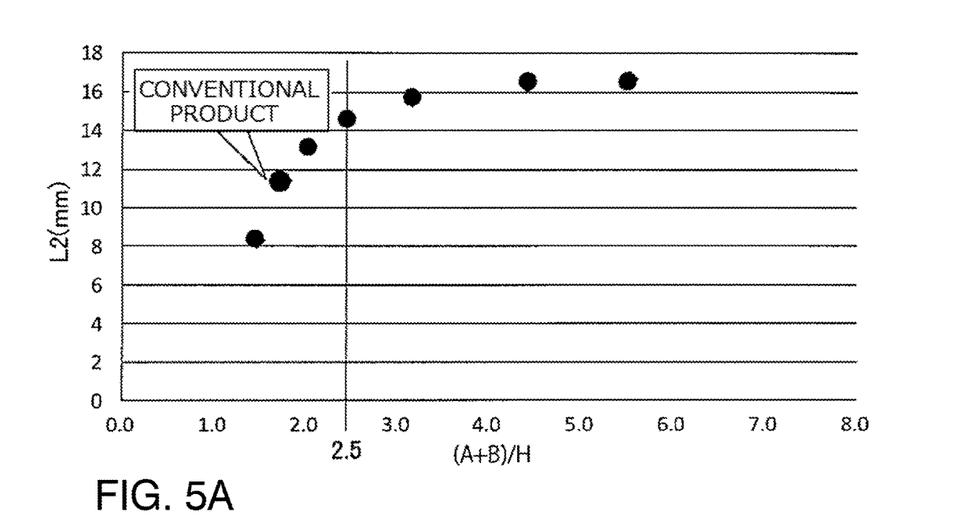
FIG. 5A is a graph illustrating effects of the constant-velocity joint according to the present embodiment and indicating a relationship between a pitching moment arm length L2 and a value of (A+B)/H that is a ratio of a sum (A+B) of a roller end surface diameter A and a roller width B to a contact portion interval H.
Figure 5B:
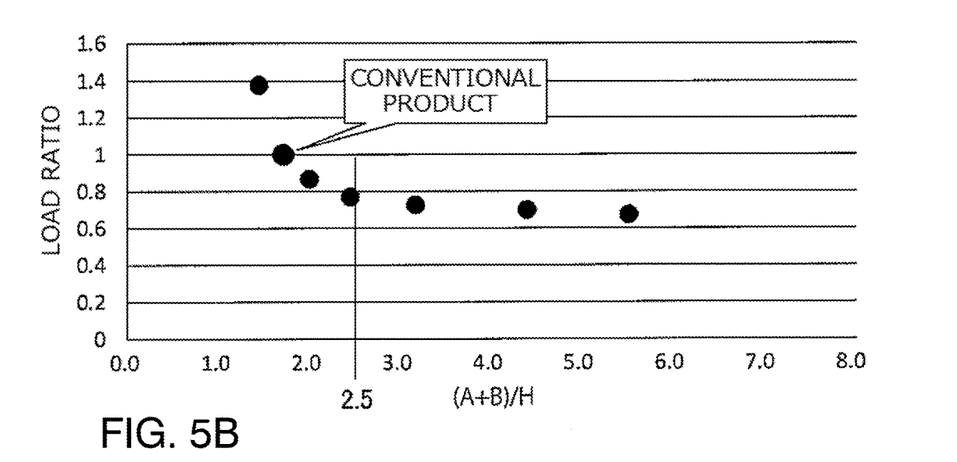
FIG. 5B is a graph illustrating effects of the constant-velocity joint according to the present embodiment and indicating a relationship between the value of (A+B)/H and a load ratio based on a contact load F on a conventional standard constant-velocity joint.

FIG. 5A and FIG. 5B are graphs illustrating the effects of the constant-velocity joint 1 according to the present embodiment. FIG. 5A is a graph indicating a relationship between the value of (A+B)/H that is the ratio of the sum of the roller end surface diameter A and the roller width B (A+B) to the contact portion interval H. FIG. 5B is a graph indicating a relationship between the value of (A+B)/H and the load ratio obtained when the contact load F on a conventional standard constant-velocity joint (conventional product) is set to be a reference, that is, set to 1. In FIG. 5A and FIG. 5B, values are plotted which result from setting the roller end surface diameter A to 32 mm, the roller width B to 12 mm, and the contact portion interval H to 30 mm, 26 mm, 22 mm, 18 mm, 14 mm, 10 mm, and 8 mm.

As is apparent from FIG. 5A and FIG. 5B, when the value of (A+B)/H that is the ratio of the sum (A+B) of the roller end surface diameter A and the roller width B to the contact portion interval H is 2.5, the pitching moment arm length L2 is approximately 15 mm. At this time, the load ratio is approximately 0.8. This means that the contact load F can be reduced by approximately 20% compared to the contact load on the conventional standard constant-velocity joint. The graphs in FIG. 5A and FIG. 5B indicate that setting the ratio (A+B)/H to 2.5 or more allows a gradual reduction in the contact load F.

The relationship illustrated in FIG. 5A and FIG. 5B is effective when C/B is 0.52 or less (C/B≤0.52) which is the ratio of the distance C, in the radial direction of the tubular portion 21, between the central position of the raceway groove 211 and the first and second contact portions 212$a$ and 212$b$ to the roller width B.

Setting C/B to 0.52 or less suppresses pitching of the roller unit 4 and makes the orientation of the axis of rotation of the rolling elements 43 with respect to the direction in which the raceway groove 211 extends close to the right angle. Thus, the outer roller 41 rotates smoothly with respect to the inner roller 42.

The above-described embodiment produces the following effects.

(1) (A+B)/H that is the ratio of the sum (A+B) of the roller end surface diameter A and the roller width B to the contact portion interval H is 2.5 or less. Consequently, the pitching moment arm length L2 can be increased to reduce the contact load F imposed on the outer roller 41. Thus, reduce frictional resistance can be reduced that is received by the outer roller 41 from the outer ring 2 when the outer roller 41 rolls in the raceway groove 211. This enables a reduction in compelling force.

(2) C/B that is the ratio of the distance C, in the radial direction of the tubular portion 21, between the central position of the raceway groove 211 and the first and second contact portions 212a and 212b is 0.52 or less. Consequently, pitching of the outer roller 41 is suppressed to allow the outer roller 41 to rotate smoothly with respect to the inner roller 42. Thus, the compelling force can be more reliably reduced.

(3) In the ceiling surface 211c of the raceway groove 211 in the outer ring 2, the recessed groove 212 is formed which is recessed outward in the tubular portion 21 and extends in the direction of the central axis of the tubular portion 21. The first and second contact portions 212a and 212b are formed at both ends of the recessed groove 212. Thus, the contact portion interval H can be defined by the groove width of the recessed groove 212. In other words, the simple configuration is used to enable the outer roller 41 to come into contact, at the two points, with the ceiling surface 211c of the raceway groove 211 at the outer edge of the annular surface 41b.

The sliding constant-velocity joint in the present invention has been described based on the embodiment. However, the present invention is not limited to the embodiment, and various aspects may be implemented without departing from the scope of the present invention. For example, the constant-velocity joint may be configured as in a variation described below.

Figure 6A:
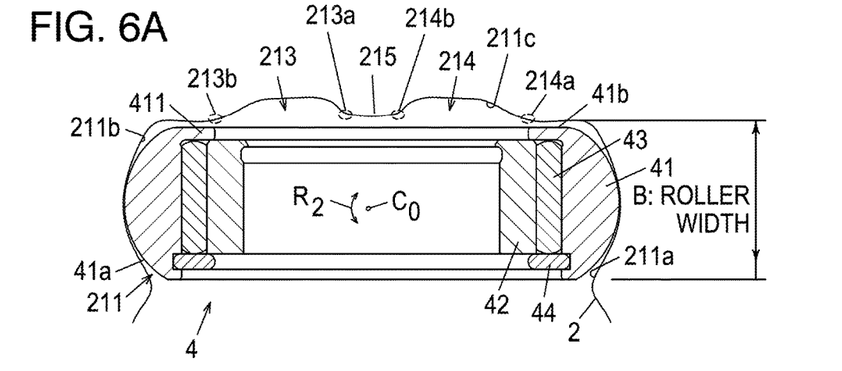
FIG. 6A is a diagram depicting a variation of the sliding constant-velocity joint according to the embodiment.
Figure 6B:
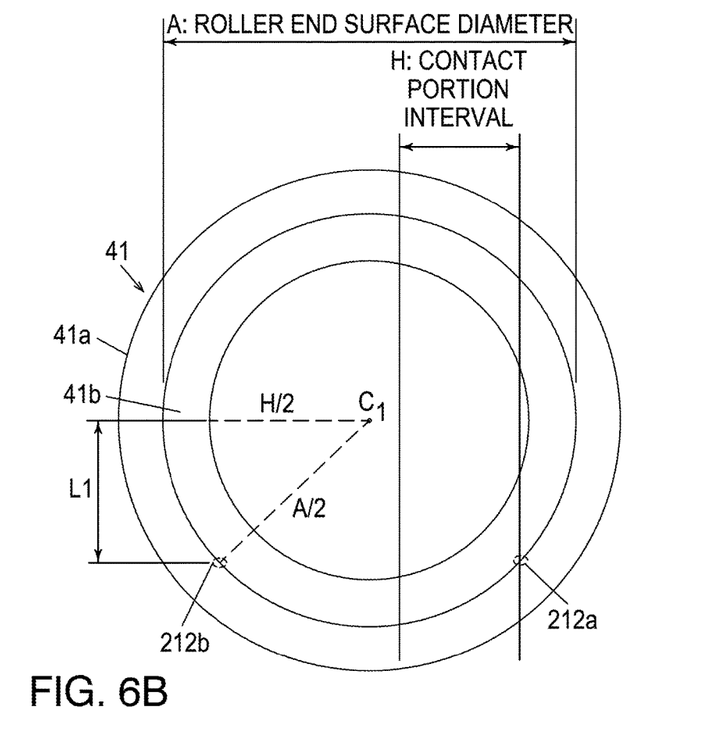
FIG. 6B is a diagram depicting a variation of the sliding constant-velocity joint.

FIGS. 6A and 6B depict a constant-velocity joint according to a variation of the embodiment. A constant-velocity joint according to the variation is different from the constant-velocity joint 1 according to the above-described embodiment in that the constant-velocity joint according to the variation has two recessed grooves (a first recessed groove 213 and a second recessed groove 214) formed in the ceiling surface 211c of the raceway groove 211 in the outer ring 2. The first recessed groove 213 and the second recessed groove 214 are formed parallel to each other across a protrusion 215 extending parallel to the direction in which the raceway groove 211 extends.

In the constant-velocity joint configured as described above, when the roller unit 4 pitches and swings around the central point $C_O$ of the outer roller 41 (rolling) as depicted by arrow R2 in FIG. 6A, the outer edge of the annular surface 41b of the outer roller 41 comes into contact with a first contact portion 213a and a second contact portion 213b at both ends of the first recessed groove 213 in a width direction thereof or with a first contact portion 214a and a second contact portion 214b at both ends of the second recessed groove 214 in a width direction thereof. In this case, the contact portion interval H is the interval between the first contact portion 213a and the second contact portion 213b corresponding to the groove width of the first recessed groove 213 or the interval between the first contact portion 214a and the second contact portion 214b corresponding to the groove width of the second recessed groove 214. The roller unit 4 actually rolls around the central point of the radius of curvature of the outside diameter of the outer roller 41 in the axial direction. However, the roller unit 4 swings by a small angle, and thus, the roller unit 4 is considered herein to swing around the central point $C_O$ of the outer roller 41.

The variation also provides effects similar to the effects of the above-described embodiment by setting (A+B)/H that is the ratio of the sum (A+B) of the roller end surface diameter A and the roller width B to the contact portion interval H to 2.5 or less, and setting CB that is the ratio of the distance C, in the radial direction of the tubular portion 21, between the central position of the raceway groove 211 and the first and second contact portions 212a and 212b to 0.52 or less.

What is claimed is:

1. A sliding constant-velocity joint comprising:
   an outer ring having a tubular portion with three raceway grooves formed in an inner peripheral surface of the tubular portion and extending in a direction of a central axis of the tubular portion;
   a tripod member having an annular boss portion coupled to a shaft and having three tripod shaft portions provided so as to extend outward from an outer peripheral surface of the boss portion in a radial direction of the boss portion, each of three tripod shaft portions provided so as to be inserted into corresponding one of the raceway grooves; and
   three roller units each having a cylindrical inner roller externally fitted over corresponding one of the tripod shaft portions so as to be able to swing, an outer roller that is rotatable coaxially with and relative to the inner roller and that has an outer peripheral surface shaped like a protruding curved surface, and a plurality of rolling elements interposed between the inner roller and the outer roller; wherein
   an inner surface of each of the raceway grooves includes a pair of raceway surfaces which has a section shaped like a recessed circular arc and on which the outer roller rolls and also includes a ceiling surface formed between the pair of raceway surfaces,
   the outer roller has a flat annular surface formed inside the outer peripheral surface shaped like a protruding curved surface and facing the ceiling surface,
   the ceiling surface includes a first contact portion and a second contact portion that come into contact with an outer edge of the annular surface of the outer roller when the roller unit is tilted in the raceway groove, and
   when an outside diameter of the annular surface of the outer roller is represented as a roller end surface diameter A, a width of the outer roller in an axial direction is represented as a roller width B, and an interval between the first and second contact portions is represented as a contact portion interval H, a relational expression (A+B)/H≥2.5 is satisfied.

2. The sliding constant-velocity joint according to claim 1 wherein
   when a distance, in a radial direction of the tubular portion, between: a central position of the raceway groove between the pair of raceway surfaces; and the first and second contact portions, is denoted by C,
   a relational expression C/B≤0.52 is satisfied.

3. The sliding constant-velocity joint according to claim 1 wherein
   in the ceiling surface, a recessed groove is formed which is recessed outward in the tubular portion and extends in the direction of the central axis of the tubular portion, and
   the first and second contact portions are formed at both ends of the recessed groove in a circumferential direction of the tubular portion.

4. The sliding constant-velocity joint according to claim 3 wherein two recessed grooves are formed in the ceiling surface.

* * * * *